March 8, 1966  R. W. ARMSTRONG  3,239,140
AIR DATA COMPUTER
Filed April 27, 1962  2 Sheets-Sheet 1
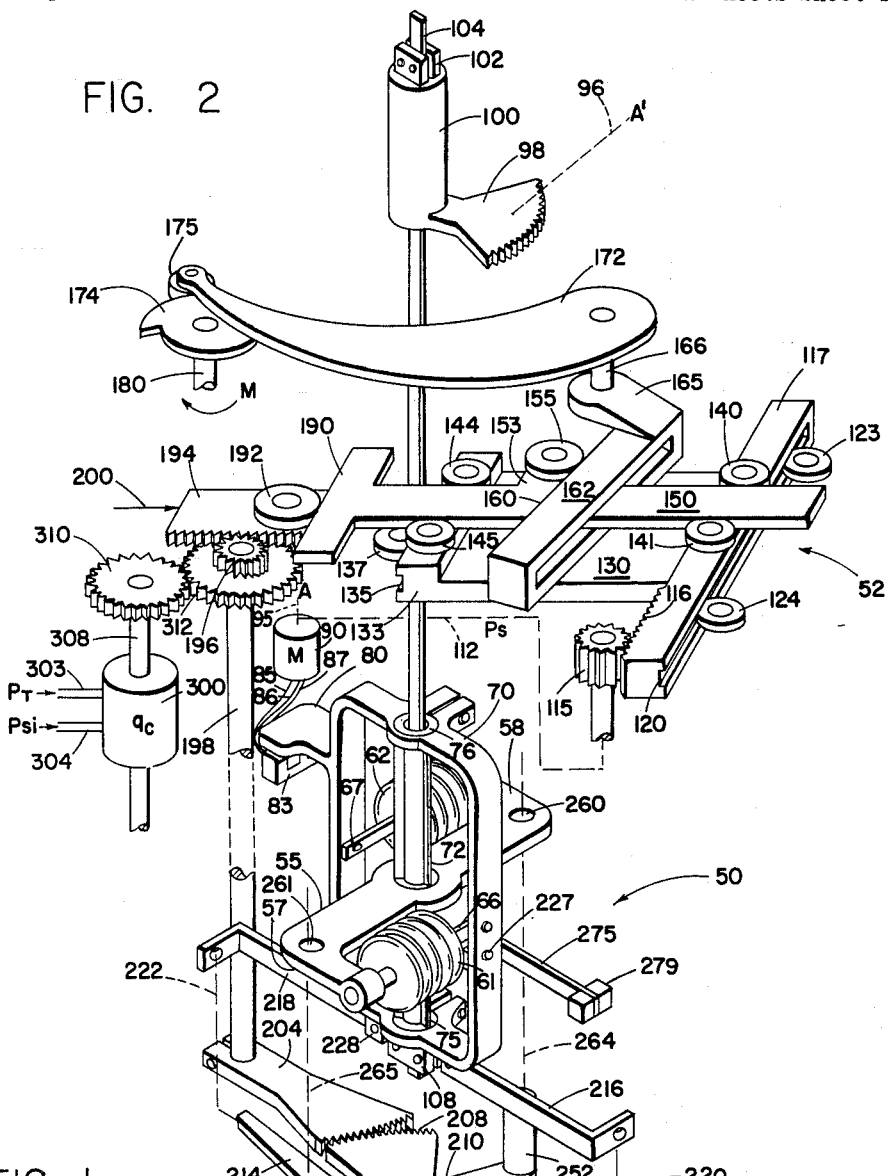
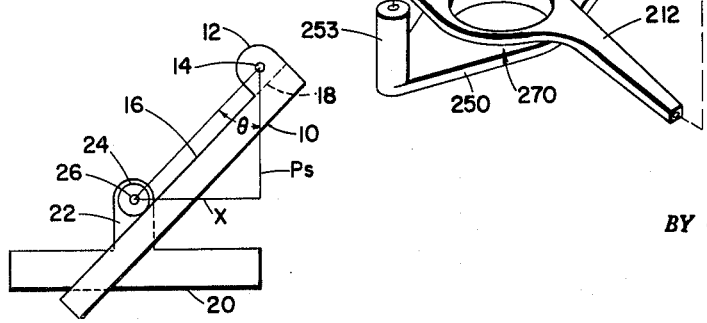
INVENTOR.
ROBERT W. ARMSTRONG
BY Charles J. Ungemach
ATTORNEY.

INVENTOR.
ROBERT W. ARMSTRONG
BY Charles J. Ungemach
ATTORNEY.

United States Patent Office 3,239,140
Patented Mar. 8, 1966

3,239,140
AIR DATA COMPUTER
Robert W. Armstrong, Mound, Minn., assignor to Honeywell Inc., a corporation of Delaware
Filed Apr. 27, 1962, Ser. No. 191,685
7 Claims. (Cl. 235—200)

This application is a continuation in part of a copending application, filed November 20, 1961, Serial Number 153,436 now abandoned, of the present inventor and assigned to the assignee of the present invention.

This invention relates to control apparatus and more particularly to air data computer apparatus utilizing novel static error correction apparatus to convert signals indicative of indicated static pressure ($P_{si}$) to true static pressure ($P_s$) and provide corrected outputs for those aircraft components that rely on true static pressure for proper indication.

It has long been known in the art that the static pressure received by the sensing device or Pitot-static tube mounted on an aircraft becomes incorrect by an amount $\Delta P$ which varies as a function of aircraft speed in terms of Mach number M. A relationship may be expressed as:

$$P_{si}-P_s=\Delta P=f(M)$$

where $\Delta P$ may be positive or negative depending on the relative magnitures of $P_{si}$ and $P_s$. In the past a number of systems have been proposed to provide a corrected static pressure source but all of these systems have had a number of disadvantages. Pneumatic systems have been proposed which employ a pump or other pressure regulating device controlled in accordance with the static error pressure $\Delta P$ to adjust the static pressure in such a manner that the pneumatic output thereof is corrected static pressure $P_s$. These systems have had the major disadvantage of slow response and for the most part are undesirable in the present day high speed aircraft where fast response is critical. Other proposed systems include electrically rebalanced systems wherein an electrical signal is generated indicative of corrected static pressure. Such electrical systems have had the major disadvantage that the present state of the art is incapable of manufacturing accurate enough components for these systems. A number of problems result such as undesirable quadrature signals, impedance matching and the like which also make such systems undesirable.

The present invention provides an output indicative of corrected static pressure which is mechanical in nature and as such is not subjected to the slow response of pneumatic systems nor to the undesirable feature of electric systems. Briefly the present invention includes a pressure transducer having indicated static pressure $P_{si}$ as one input and providing an output in the form of a shaft rotation in accordance therewith. A mechanical static pressure error correcting device is provided which receives as an input the shaft rotation produced by the transducer device and also receives as a second input a shaft rotation which is characterized as a function of airspeed in terms of Mach number. The mechanical static error correcting device operates upon these two inputs to provide an output indicative of the static pressure error $\Delta P$ which output is also in the form of a shaft rotation. This $\Delta P$ signal is mechanically coupled back to the transducing apparatus to adjust the apparatus in such a direction that the correction signal $\Delta P$ is combined with the signal indicative of indicated static pressure $P_{si}$ so that the output of the transducer becomes corrected static pressure $P_s$. The output of the transducer which is now corrected static pressure $P_s$ may be used in the various portions of the aircraft instruments where corrected static pressure is needed and no further correction is necessary. The output of the static error corrector, as stated, is the correction signal $\Delta P$ and this in itself may be used to correct other instruments such as the differential pressure transducer.

A more complete understanding of the present invention will be obtained upon examination of the following specification, claims and drawings in which:

FIGURE 1 is a schematic representation of the basic principle involved in the static error correction mechanism;

FIGURE 2 is a partly schematic and partly exploded view of the static pressure transducer and static error correcting mechanism employing the present invention.

Figure 3:
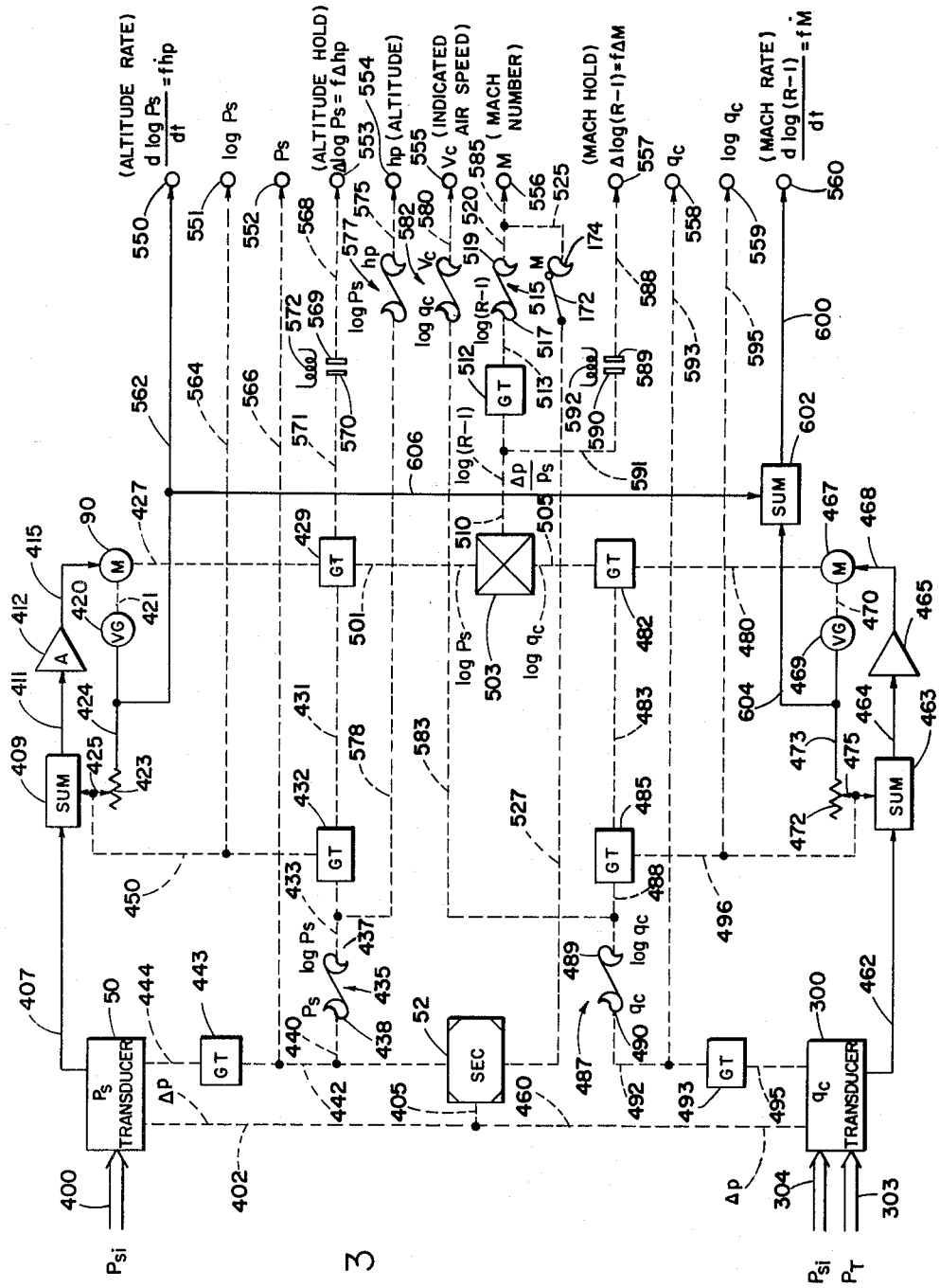
FIGURE 3 is a block diagram of an air data computing system employing static error correction.

Referring now to FIGURE 1, a rotatable arm 10 is shown having a laterally extending flange 12 at one end thereof which contains a pivot axis 14. The rotatable member 10 has a bearing surface 16 which extends under the flange portion 12 as shown by the dashed line 18.

Also shown in FIGURE 1 is a movable member 20 having a flange portion 22 upon which is mounted a bearing member or roller 24. Roller 24 is caused to bear against the bearing surface 16 of member 10 and the pivot axis 26 of roller 24 is such that it is the same distance from the bearing surface 16 as the pivot axis 14 of member 10. By this arrangement it is seen that member 20 can be placed so that roller 24 is positioned directly under the flange portion 12 of member 10 so that axis 26 of roller 24 would coincide with axis 14 of member 10.

Member 20 is caused by means not shown to move in a vertical direction under the influence of static pressure and under zero static pressure conditions axis 26 would coincide with axis 14. The vertical displacement of axis 26 from concidence with axis 14 will be controlled according to static pressure and in FIGURE 1 this distance has been shown as the vertical line of a right triangle identified with reference numeral $P_s$.

Member 10 is caused to rotate as a function of aircraft speed in terms of Mach number. It is known that the static pressure error $\Delta P$ varies with Mach number in a predetermined fashion and consequently the ratio $\Delta P/P_s$ is also a function of airspeed in terms of Mach number. By characterized means, not shown in FIGURE 1, member 10 is caused to rotate as a function of arc tangent $\Delta P/P_s$ and the amount of rotation has been shown in FIGURE 1 as angle $\theta$ which is the angle between the vertical side of the triangle $P_s$ and the line joining axis 14 with axis 26 which comprises the hypotenuse of the triangle shown in FIGURE 1.

The amount of horizontal movement of axis 26 from the zero static pressure condition has been shown in FIGURE 1 as the distance of the horizontal portion of the triangle identified by reference numeral X. It is clear from FIGURE 1 and the triangle that $X=P_s$ tangent $\theta$ and since, as previously stated, $\theta$ is caused to be a function of arc tangent $\Delta P/P_s$, $$X=KP_s \text{ tangent}\left(\text{arc tangent } \frac{\Delta P}{P_s}\right)$$

or $$X=KP_s\left(\frac{\Delta P}{P_s}\right)$$

or $X=K\Delta P$, where K is a factor of proportionality determined by the geometry of the mechanism.

It is therefore seen that the amount of horizontal displacement of pivot point 26 and consequently the horizontal displacement of member 20 is proportional to the static error signal ΔP and means are provided not shown in FIGURE 1 to measure this horizontal displacement and convert it into the ΔP signal used for the remainder of the system.

FIGURE 2 shows a practical embodiment of the present invention including in the lower portion the static pressure transducer identified by reference numeral 50 and in the upper portion the static error correction mechanism identified by reference numeral 52.

The static pressure transducer comprises a Z-shaped member 55 which is fixed to the container (not shown) which houses the transducer mechanism. Z-shaped member 55 has two oppositely directed flanges 57 and 58 at either end thereof which flanges have connected thereto a pair of pressure sensitive devices or bellows 61 and 62 respectively. Bellows 61 and 62 are both evacuated in the static pressure transducer 50 while the interior of the container is supplied with the indicated static pressure $P_{si}$ provided from the Pitot-static probe on the aircraft. Thus as the indicated static pressure changes bellows 61 and 62 will each contact or expand. Since bellows 61 and 62 are oppositely directed, they produce forces with changes in indicated static pressure in opposite directions. Bellows 61 and 62 each have a force applying linkage shown in FIGURE 2 as bars 66 and 67 respectively. Bars 66 and 67 are connected on opposite sides of a generally O-shaped yoke 70. Yoke 70 is mounted on the Z-shaped member 55 by a quadrilever type spring 72 which is fastened to the Z-shaped member 55 at the center and which extends in opposite directions to the yoke 70 where it is fastened as at 75 and 76 respectively. This quadrilever type spring 72 provides a spring biased pivot for the yoke 70 and since bellows 61 and 62 apply forces varying with $P_{si}$ to yoke member 70 in opposite directions, changes in $P_{si}$ produce a torque on yoke member 70 which turns yoke member 70 with respect to the Z member 55 by an amount depending upon the stiffness of the transducer system spring rate and the amount of change of $P_{si}$.

Yoke member 70 has a lateral extension 80 which is in the form of a magnetic armature cooperating with an E-shaped transformer 83 which is connected to the container housing the transducer 50 by means not shown. It is seen however that rotation of yoke 70 causes displacement of armature 80 with respect to E transformer 83 whenever the indicated static pressure $P_{si}$ changes. This displacement of the armature 80 with respect to the E transformer 83 produces a signal on wires 85, 86 and 87 which lead to a motor shown generally as 90. Thus any change in indicated static pressure $P_{si}$ will cause motor 90 to operate in a first or second direction depending upon whether $P_{si}$ has increased or decreased. Of course, other type pickoff means may be employed in place of E transformer 83 and if necessary an amplifier may be used between the pickoff and the motor 90.

Motor 90 has an output shown by dashed line 95 which is shown in FIGURE 2 terminating at reference numeral A. The dashed line connection 95 is connected by means not shown in FIGURE 2 to a corresponding reference numeral A', shown in the upper portion of the drawing, which is connected by mechanical connection shown as dashed line 96 to a gear sector 98 which forms a portion of a torsion tube 100. As will be described with regard to FIGURE 3, various apparatus may be included between the reference numerals A and A' such as gear trains and cams but are not shown in FIGURE 2 for purposes of clarity. Torsion tube 100 has a clamp 102 at the upper end thereof which clamps a torsion bar 104. Torsion bar 104 is shown generally rectangular in cross section and extends down through the torsion tube 100 and down through the center of the quadrilever spring 72 and is clamped to the yoke member 70 at the bottom portion thereof by a clamp 108. It is seen that rotation of motor 90 operating through mechanical connections 95 and 96 will cause rotation of gear sector 98 and torsion tube 100 to apply a torque to the torsion bar 104 which in turn transmits this torque to the yoke member 70. Rotation of yoke member 70 occasioned by a change in indicated static pressure $P_{si}$ will thus cause movement of armature 80 with respect to a transformer 83 and drive motor 90 in such a direction that the rotation of torsion tube 100 and torsion bar 104 applies an oppositely directly torque to the yoke member 70 to accomplish rebalance of the system. That is to say, as soon as yoke member 70 rotates under the influence of a change in indicated static pressure $P_{si}$ an oppositely directed torque is applied by means of torsion bar 104 to yoke member 70 to return it to its original state of equilibrium at which time motor 90 stops and the position thereof would be indicative of the new indicated static pressure $P_{si}$.

Also connected to the output of motor 90 is a mechanical connection shown as dashed line 112 which operates to turn a gear 115 in the static error correction mechanism 52. Gear 115 cooperates with a rack 116 which is part of a member 117 in the static error corrector mechanism 52. Member 117 is provided with guide means such as a trough 120 in which a pair of rollers 123 and 124 operate. Rollers 123 and 124 are connected to the frame or casing (not shown) housing the static error correction mechanism 52. Member 117 also has a lateral extension in the form of a flat plate 130 which extends to the left in FIGURE 2 and which has a vertically extending abutment 133 at the remote end thereof. Vertically extending abutment 133 is also provided with guide means such as a trough 135 in which members such as roller 137 operate. Roller 137 is likewise connected to the frame or casing (not shown) housing the static error correction mechanism 52. Rollers 123, 124 and 137 operate to guide member 117 and the lateral extension 130 in a direction generally into and out of the plane of the drawing of FIGURE 2. As seen, energization of motor 90 will cause rotation of gear 115 which will in turn cause motion of member 117 as guide by rollers 123, 124 and 137.

Member 117 carries a pair of rollers or guide members 140 and 141 and also carries on the vertically extending abutment 133 a pair of rollers or guide members 144 and 145. Rollers 140, 141, 144 and 145 on member 117 cooperate with a generally T-shaped member 150 and operate to guide member 150 in a direction perpendicular to the motion of member 117. That is to say, T-shaped member 150 is able to move in a direction substantially parallel to the plane of the drawing of FIGURE 2.

Member 150 has a lateral extension 153 which in turn carries a guide member such as a roller 155 thereon. Roller 155 is positioned so as to bear on a surface 160 of a rotatable member 162.

Rotatable member 162 is shown in FIGURE 2 as formed like an open box through which member 150 extends in such a manner that roller 155 can cooperate with the surface 160. Member 162 also has a laterally extending portion 165 which carries a pivot 166. Pivot 166 is positioned on extension 165 at a distance from surface 160, which extends under extension 165, equal to the distance from the pivot of roller 155 to the surface 160. This enables roller 155 to occupy a position whereby its pivot is directly under pivot 166. Pivot 166 is connected by bearing means (not shown) to the frame or casing housing the static error correction mechanism 52 so that it is free to rotate with respect thereto. Connected to the upper portion of pivot 166 is a follower arm 172 which extends to a cam 174 and which has a roller or follower means 175 cooperating with the surface of cam 174. Cam 174 in turn has a shaft 180 connected thereto which is caused to rotate by means not shown in FIGURE 2 as a function of airspeed in terms of Mach number as indicated by the arrow and the designation "M" in FIGURE 2.

In the apparatus thus far described it is seen that rotation of shaft 180 will cause rotation of cam 174 and will thus cause movement of follower arm 172 which operating through pivot 166 will cause rotatable member 162 to rotate. This rotation will be accompanied by movement of the roller 155 to the left or to the right in FIGURE 2 depending upon the direction of rotation of member 162. Likewise it is seen that rotation of shaft 112 connected to motor 90 will cause rotation of gear 115 and thus cause movement of member 117 generally into or out of the plane of the drawing of FIGURE 2. This movement of member 117 will be accompanied by movement of member 150 to the right or to the left since roller 155 is caused to bear against surface 160.

As explained with regard to FIGURE 1, motion of member 150 to the left or to the right is a product of the amount of movement of member 117 and the tangent of the angle through which rotatable member 162 has rotated. As stated, the motion of member 117 is proportional to static pressure as provided by the motor 90 and rotation of member 162 is proportional to a desired function of Mach number. Cam 174 is so characterized that rotation of member 162 is proportional to the arc tangent of the ratio $\Delta P/P_s$ which ratio is known to be a predetermined function of aircraft speed in terms of Mach number. Thus, motion of member 150 to the left and to the right is indicative of the correction factor $\Delta P$ since the mechanism operates to multiply the ratio $\Delta P/P_s \times P_s$.

This motion to the right or to the left indicative of $\Delta P$ is transmitted from member 150 by means of a T-shaped extension 190 at the left end thereof which cooperates with a guide member of roller 192 connected to a rack 194. Thus motion of member 150 will be accompanied by motion of rack 194 and this motion is transmitted to a gear 196 which is mounted on a shaft 198. It is seen that rotation of shaft 198 is also proportional to the static error correction $\Delta P$. Spring means shown as arrow 200 operate on rack 194 to force roller 192 against the T-shaped surface 190 and thus push member 150 and roller 155 against the surface 160 of rotatable member 162. Spring 200 therefore holds the mechanism in an engaged position with the various rollers and surfaces biased towards each other.

As stated shaft 198 rotates in accordance with the static error correction $\Delta P$ and this rotation is imparted to a gear sector 204 connected at the lower end thereof.

Gear sector 204 cooperates with a gear sector 208 which forms a part of a member 210. Member 210 has first and second elongated extensions 212 and 214 respectively which are attached to a pair of cantilever spring members 216 and 218 as shown by dashed lines 220 and 222. Springs 216 and 218 are fastened to the lower portion of yoke member 70 on opposite sides and spaced from clamp 108 by means of a pair of extensions such as shown at 228. It is seen that as gear sector 204 rotates member 210 will rotate which will in turn apply a torque to yoke member 70 through springs 216 and 218. Since the rotation of gear sector 204 is proportional to that of shaft 198 which in turn is proportional to the static error correction quantity $\Delta P$, the correcting force applied from member 210 through springs 216 and 218 to yoke 70 is proportional to the static error correction $\Delta P$. This correction torque on yoke member 70 causes movement thereof in a direction which when taken together with the torque applied from the indicated static pressure $P_{si}$ provides the necessary correction and the resultant movement of yoke member 70 is proportional to corrected static pressure $P_s$. Stated differently, the mechanism shown in the force transducer 50 applies a correcting force $\Delta P$ which is algebraically summed with the indicated static pressure force $P_{si}$ to provide an output $P_s$ which as mentioned is related to corrected static pressure $P_s$ by the equation $P_{si} - P_s = \Delta P$. Thus it is seen that the pressure transducer 50 has an output proportional to corrected static pressure $P_s$ which output may be utilized in the aircraft for those indications where corrected static pressure is necessary.

Also shown in FIGURE 2 is a member 250 which has a pair of upwardly extending cylindrical portions 252 and 253. Portions 252 and 253 of member 250 when the unit is assembled are attached to the Z-shaped member 55 at holes 260 and 261 respectively as shown by dashed lines 264 and 265. Member 250 has a bearing connection with member 210 at the portion between them shown by arrow 270 so that member 210 is free to rotate with respect to member 250.

Also shown in FIGURE 2 is a force applying device 275 attached to the yoke member 70 at point 277. Member 275 carries a temperature sensitive element 279 which operates to apply a force to the yoke member 70 in accordance with temperature and thereby provide the transducer 50 with temperature compensation.

Also shown in FIGURE 2 is a transducer 300 identified with the letter $q_c$. Transducer 300 is substantially identical in structure to static pressure transducer 50 herein described and will not be itself described in detail. The only difference between the $q_c$ transducer 300 and the static pressure transducer 50 is that the $q_c$ transducer produces an output proportional to the difference between total pressure $P_T$ and static pressure $P_s$. This difference is defined as $q_c$ and requires that the transducer have two inputs $P_T$ as shown by conduit 303 and $P_{si}$ as shown by conduit 304. The interior of transducer 300 will be the same as the interior of the static pressure transducer 50 herein described except that the bellows 61 and 62 which were described as evacuated in the static pressure transducer 50 will have static pressure applied to their interiors and total pressure $P_T$ in the case will be applied to their exteriors. Therefore in the $q_c$ transducer 300 motion of the yoke member corresponding to member 70 will be in accordance with the difference between total pressure $P_T$ and static pressure $P_s$. Transducer 300 has an input correcting for the static error $\Delta P$ by means of a shaft 308 which corresponds to the shaft 198 for the static pressure transducer 50. Shaft 308 is connected to a gear 310 which is in turn connected to a gear 312 mounted on the shaft 198. Therefore as the rack member 194 moves in accordance with static error correction $\Delta P$, gear 312, gear 310 and shaft 308 will rotate accordingly. By a mechanism similar to that shown in describing the static pressure transducer 50, this correction factor $\Delta P$ will be applied to the $q_c$ transducer so that its output is indicative of the difference between total pressure $P_T$ and corrected static pressure $P_s$.

Referring now to FIGURE 3, which shows in schematic diagram form one embodiment of an air data computer incorporating the static error correction, a $P_s$ transducer 50, which may be the same as that apparatus shown in FIGURE 2, is shown having an input conduit 400 which provides the transducer with the pressure $P_{si}$ derived from the indicated static pressure source on the aircraft. A mechanical input shown as dash line 402 is shown connected to transducer 50 to supply the transducer with the correction signal $\Delta P$. Mechanical connection 402 is shown connected by a second mechanical connection 405 to the static error corrector 52 which may be the same as that shown in FIGURE 2. Mechanical connections 402 and 405 may comprise the apparatus including roller 192, rack 194, gear 196 and shaft 198 of FIGURE 2.

Static pressure transducer 50 provides an electrical output whenever a change in true static pressure $P_s$ causes unbalance of transducer 50. This output is shown in FIGURE 3 as emerging on conductor 407 and being fed to a summing network 409 which is in turn connected by a conductor 411 to an amplifier 412. The output of amplifier 412 drives motor 90 by means of a connection 415. Motor 90 is FIGURE 3 is the equivalent of motor 90 in FIGURE 2 and the conductor 407, summing network 409, conductor 411, amplifier 412 and connection 415 comprise apparatus placed between E transformer 83 and motor 90 which in FIGURE 2 was shown merely as conductors 85, 86 and 87.

Rate feedback is provided in FIGURE 3 by means of a velocity generator 420 connected to motor 90 by a mechanical connection shown as dash line 421. The output of velocity generator 420 is fed to a resistor 423 by a conductor 424. Resistor 423 includes a movable wiper 425 which is connected back to the summing network 409 to provide the desired rate feedback.

The mechanical motion of motor 90 is caused to rebalance the $P_s$ transducer 50 in the following manner. A mechanical connection 427 is placed between motor 90 and a gear train 429. Gear train 429 has a first output connection 431 leading to a second gear train 432. Gear train 432 has mechanical connection 433 leading to a characterized cam shown in FIGURE 3 as a tape cam 435. Cam 435 is so characterized that it converts motion indicative of a first condition to a motion indicative of the log of the first condition or vice-versa. Specifically this cam is so characterized as to concert log of $P_s$ to $P_s$. Thus if a first portion 437 of cam 435 turns as the log of $P_s$ a second portion 438 of cam 435 will turn as $P_s$. Cam 435 has a mechanical connection shown as dash line 440 connected to a second mechanical connection shown as dash line 442 to a gear train 443 and from there by a mechanical connection shown as dash line 444 to the $P_s$ transducer 50 to accomplish rebalance. Connection 442 is also shown providing an input to the static error correction mechanism 52. The mechanical connections above described between motor 90 and $P_s$ transducer 50 including elements 427 through 444 may comprise apparatus between A and A' in FIGURE 2. Likewise the connections from motor 90 to the static error corrector 52 including elements 427 through 442 may correspond to the mechanical connection 112 in FIGURE 2.

Because cam 435 is characterized to convert log $P_s$ to $P_s$, motor 90 is caused to turn as a function of log $P_s$. Gear trains 429 and 432 operate to reduce the number of turns of motor 90 to a value compatible with the limited amount of rotation available with cam 435. Since motor 90 operates as a function of log $P_s$, mechanical connections 427, 431 and 433 also operates as functions of log $P_s$. However, mechanical connections 440, 442 and 444 operate as a function of $P_s$ itself since they are on the far side of cam 435. Therefore, as described in connection with FIGURE 2, an input on mechanical connection 442 indicative of $P_s$ is presented to the static error corrector 52 and a rebalance signal indicative of $P_s$ is presented to transducer 50 by mechanical connection 444.

It has been found that the stability of the above described servo loop changes as a function of static pressure so as to tend to be overdamped at low pressures. To compensate for this change in mechanical gain, a mechanical connection shown as dash line 450 is connected between gear train 432 and the wiper 425 associated with the rate feedback network above described. Mechanical connection 450 turns as a function of log $P_s$ as above described and operates to position wiper 425 so that various amounts of rate feedback damping are provided depending upon the magnitude of the static pressure. By providing more or less rate feedback damping signal in accordance with the magnitude of static pressure, servo loop damping compensation for the change of stability in the servo loop with change of static pressure is accomplished thus preserving optimum frequency response.

Also shown in FIGURE 3 is the $q_c$ transducer 300 having a $P_{si}$ input fed thereto by means of conduit 304 and a $P_T$ input fed thereto by means of conduit 303. A mechanical connection from the static error corrector 52 is provided for the $q_c$ transducer 300 as shown by dash lines 460 and 405. The mechanical connections 405 and 460 may comprise the roller 192, rack 194, gears 196, 312 and 310 and the shaft 308 of FIGURE 2.

An electrical output from the $q_c$ transducer is provided on the conductor 462 which is shown connected to a summing network 463 and then by a conductor 464 to an amplifier 465. Amplifier 465 is connected to a motor 467 by a connection 468. Rate feedback for this motor is provided by means of a velocity generator 469 connected to motor 467 by a connection shown as dash line 470. The output of velocity generator 469 is presented to a resistor 472 by a conductor 473. Resistor 472 has a wiper 475 connected back to the summing network 463 to provide the requisite rate feedback. The output of motor 467 is shown as a dash line 480 connected to a gear train 482.

Rebalance of the $q_c$ transducer is provided by a connection shown as dash line 483 from gear train 482 to a second gear train 485. Gear train 485 is connected to a characterized cam 487 by a connection shown as dash line 488. Cam 487 may be a tape cam like cam 435 and has a first portion 489 and a second portion 490. The characterization of cam 487 is such that as cam 489 rotates as a function of log $q_c$ portion 490 will rotate as a function of $q_c$. Cam 487 is connected to $q_c$ transducer 300 by mechanical connection shown as dash line 492, a gear train 493 and a mechanical connection shown as dash line 495. Because of the characterization of cam 487, motor 467, mechanical connection 480, mechanical connection 483 and mechanical connection 488 move as functions of log $q_c$ whereas mechanical connections 492 and 495 move as functions of $q_c$. Connection 495 to $q_c$ transducer 300 provides rebalance in much the same fashion as was described with regard to the $P_s$ transducer 50 in FIGURE 2. Gear trains 482, 485 and 493 are used for purposes of converting the amounts of rotation of the shafts to smaller or larger quantities as desired.

As with the $P_s$ servo loop, the $q_c$ servo loop also changes gain in accordance with changes of $q_c$. A similar means of compensating for this change of gain is shown in FIGURE 3 as a mechanical connection shown as dash line 496 connected between gear train 485 and wiper 475 of resistor 472. As $q_c$ changes, mechanical connection 496 will move wiper 475 to provide more or less rate feedback and to compensate for the change in gain.

As previously stated the output of motor 90 is operating at the function of log $P_s$ and the output of motor 467 is operating as a function of log $q_c$. Gear train 429 has a connection shown as dash line 501 connected to a differential 503. This connection provides an input to the differential 503 which is a function of log $P_s$. Gear train 482 has a mechanical connection shown as dash line 505 connected to differential means, often termed a summing means 503. This provides an input to differential 503 which is a function of log $q_c$. The output of the differential is the algebraic difference between the two inputs and this output is shown as dash line 510 in FIGURE 3. The signal on the output connection 510 may be expressed as $$\text{Log } q_c - \log P_s = \text{Log } \frac{q_c}{P_s} \qquad (1)$$

Since $q_c = P_T - P_s$ Equation 1 becomes $$\text{Log } q_c - \log P_s = \text{Log} \frac{P_T - P_s}{P_s} = \log\left(\frac{P_T}{P_s} - 1\right) \qquad (2)$$

$$\frac{P_T}{P_s} - 1$$

has long been recognized as a function of air speed in terms of Mach number and is usually written as $R-1$ where R is defined as $P_T/P_s$. The motion of mechanical connection 510 is therefore a function of log $(R-1)$ which in turn is a function of Mach number. Mechanical connection 510 is shown connected to a gear train 512 and then by a mechanical connection shown as dash line 513 to a cam 515. Cam 515 is shown as a tape cam but unlike cams 435 and 487 is characterized to convert the function log $(R-1)$ to a function of Mach number M. That is to say, as a first portion 517 of cam 515 rotates as a function of log $(R-1)$, a second portion 519 of cam 515 moves as a function of Mach number M. A mechanical connection shown as dash line 520 connected to cam 515 therefore rotates as a function of Mach number M. Connected to mechanical connection 520 is another mechanical connection shown as dash line 525 which is shown leading to a cam and follower arrangement similar to that shown in FIGURE 2 as cam 174 and follower arm 172. The purpose of this cam arrangement is to provide an output indicative of the quantity $\Delta P/P_s$ which, as previously explained, is a function of Mach number. This motion is presented to the static error corrector 52 by means of a mechanical connection shown as dash line 527. Mechanical connection 525 may be equivalent to the shaft 180 shown in FIGURE 2 while mechanical connection 527 may be equivalent to the pivot 166 in FIGURE 2. It should be remembered at this point that log $(R-1)$ is in itself a function of Mach number and if desired connection 525 could be connected to mechanical connection 510 rather than mechanical connection 520 providing cam arrangement 174, 172 were characterized so as to convert log $(R-1)$ to a function of $\Delta P/P_s$.

As shown with regard to FIGURE 2 the static error correction mechanism 52 operating on an input of $P_s$ and an input of $\Delta P/P_s$ produces the required correction signal $\Delta P$ which is shown in FIGURE 3 as emerging on mechanical connection 405 and is presented to the $P_s$ transducer 50 and the $q_c$ transducer 300 by mechanical connections 402 and 460 respectively to provide the requisite correction for static pressure error.

In order to produce a number of outputs necessary for aircraft operation the air data computer as shown in FIGURE 3 has a variety of connections to various portions within the computer each operable to produce a desirable output. As examples of the kinds of outputs frequently desired in air data computers FIGURE 3 shows 11 terminals numbered 550 through 560. Terminal 550 is shown producing an output $$\frac{d \text{ Log } P_s}{d_T}$$

or rate of change of log $P_s$. This output is a known function of rate of change of altitude $\dot{h}_p$. Rate of change of log $P_s$ is easily derived in the circuit of FIGURE 3 by a connection shown as conductor 562 connected to the output conductor 424 of velocity generator 420. As previously stated motor 90 is turning as a function of log $P_s$ and therefore velocity generator 420 produces an output indicative of rate of change of log $P_s$. Standard characterized means may be employed to convert the signal $$\frac{d \text{ Log } P_s}{d_T}$$

to $\dot{h}_p$.

Terminal 551 is shown having an output of log $P_s$. This output is derived by a mechanical connection shown as dash line 564 connected to a mechanical connection 450 which as previously mentioned moves as a function of log $P_s$. Of course, mechanical connection 564 could be connected elsewhere in this system and still obtain a signal indicative of log $P_s$. For example an output from gear train 429, mechanical connection 431 or mechanical connection 433 could be connected to mechanical connection 564 since each of these connections is moving as a function of log $P_s$.

Terminal 552 is shown producing an output $P_s$. This is derived in FIGURE 3 by mechanical connection shown as dash line 556 connected to mechanical connection 442 which as previously mentioned moves as a function of $P_s$. As before, mechanical connection 566 could be connected elsewhere in the circuit and still obtain a $P_s$ output. For example connection 566 could be connected to connection 444 or gear train 443 as easily.

Terminal 553 is shown producing an output $\Delta$ log $P_s$ or change of log $P_s$ from some predetermined value. The change of log $P_s$ output is a known function of change of altitude $h_p$ and may be used as an altitude hold signal for the aircraft's autopilot. This altitude hold signal is derived from a connection shown as dash line 568 which is connected to one portion of a clutch 569, the other portion of which 570 is connected to gear train 429 by a connection shown as dash line 571. Clutch 570 may be operated electromagnetically by means of a coil 572. As previously stated the outputs from gear train 429 operate as functions of log $P_s$ and so connection 571 also moves as a function of log $P_s$. Since log $P_s$ is a function of altitude $h$, when altitude hold is desired the coil 572 may be energized by the pilot thereby engaging clutch members 569 and 570. From the time of engagement of clutch, a signal is presented to output terminal 553 which will show change of log $P_s$ from that which existed at the time of engagement. This change of log $P_s$ may be used thereafter to control the autopilot and hold the aircraft at the predetermined desired altitude. Clutch member 569 may be connected to a recentering spring not shown to bring clutch member 569 back to its initial position when the clutch is again deenergized.

Output terminal 554 is shown producing an output indicative of altitude $h_p$. This is derived from a mechanical connection shown as dash line 575 connected to cam 577. Cam 577 is connected by a mechanical connection shown as dash line 578 to the mechanical connection 433 which as previously stated is moving as a function of log $P_s$. Cam 577 is so characterized as to convert log $P_s$ to altitude $h_p$.

Output terminal 555 is shown producing an output of indicated air speed $V_c$. This output is obtained by a mechanical connection shown as dash line 580 connected to a cam 582. Cam 582 is connected by a mehanical connection shown as dash line 583 to mechanical connection 488. As previously stated mechanical connection 488 is moving as a function of log $q_c$ and hence connection 583 moves as a function of log $q_c$. Cam 582 is so characterized as to convert log $q_c$ to indicated air speed $V_c$.

Output terminal 556 is shown producing a Mach number output M. This is derived from a mechanical connection shown as dash line 585 connected to mechanical connection 520 which as previously described moves as a function of the Mach number.

Output terminal 557 is shown producing an output indicative of change of log $(R-1)$. This in turn is a function of change in Mach number and may be used to produce a signal for the autopilot to provide a Mach hold function. The output of terminal 557 is derived from a mechanical connection shown as dash line 588 which is shown connected to one portion of a clutch 589, the other portion 590 of which is connected by a mechanical connection shown as dash line 591 to mechanical connection 510. As previously stated mechanical connection 510 moves as a function of log $(R-1)$ so that mechanical connection 591 similarly moves. Also as previously stated log $(R-1)$ is a function of Mach number. Clutch members 589 and 590 are engaged by a coil 592 so that when it is desired to hold Mach, the pilot may engage members 589 and 590 after which mechanical connection 588 moves with mechanical connection 591. A signal is thus provided indicative of change of Mach number from the value existing at the time of engagement. This signal may be sent to the autopilot to provide the desired Mach hold function. As with clutch 569, 570, clutch 589, 590 may be recentered by means of a spring not shown so that when the clutch is deenergized member 589 will return to its original position.

Output terminal 558 is shown producing a signal indicative of $q_c$. This signal is obtained from a mechanical connection shown as dash line 593 connected to mechanical connection 492. As previously stated connection 492 moves as a function of $q_c$ so that shaft 593 moves likewise.

Output terminal 559 is shown producing a signal indicative of log $q_c$. This signal is derived from a mechanical connection shown as dash line 595 connected to the mechanical connection 496. As previously stated connection 496 moves as a function of log $q_c$ and hence connection 595 does likewise.

Output 560 is shown producing a signal indicative of $$\frac{d \, \mathrm{Log} \, (R-1)}{d_\mathrm{T}}$$

or rate of change of log $(R-1)$. Rate of change of log $(R-1)$ is proportional to rate of change of Mach and hence the signal at output 560 may be used to be indicative of Mach rate. This signal is derived from a conductor 600 shown connected to a summing apparatus 602 which may be a standard summing amplifier. Summing apparatus 602 is connected to the output of velocity generator 469 by a conductor 604 and is connected to the output of velocity generator 420 by conductor 562 and a conductor 606. A signal from velocity generator 469 is indicative of a rate of change of $q_c$ whereas the signal from velocity generator 420 is indicative of rate of change of $P_s$. When combined in summing network 602 an output is obtained which is indicative of rate of change of $q_c/P_s$ which as previously defined is a function of rate of change of Mach.

As stated previously with regard to the outputs log $P_s$ and $P_s$ the connections leading to the other outputs can be connected elsewhere in the circuit. For example, $q_c$ output on 558 could be connected by mechanical connection 593 to connection 495 rather than 492 and the log $q_c$ output on terminal 559 could be connected to mechanical connections 480, 483 or 488 rather than connection 496. I therefore do not intend to be limited to the specific connections shown in FIGURE 3 since one skilled in the art could place the connections to other appropriate places to take best advantage of gear train scale factors.

The various shaft outputs 550 through 569 in FIGURE 3 may be connected to data transmitting devices such as synchros or potentiometers to supply signals to indicators and autopilot components in a standard straight forward manner bearing in mind that several of the outputs would necessarily require some characterization before final usage. For example with regard to the output at terminal 550 which was stated as varying with the rate of change of log $P_s$, when it is desired to provide an indication or an autopilot signal indicative of altitude rate this signal must be characterized to convert log $P_s$ to $h_p$. Likewise the altitude hold and Mach hold signals appearing on terminals 553 and 557 are only functions of these conditions and apparatus such as characterized potentiometers may be necessary to change $\Delta \log P_s$, to $\Delta h_p$ and $\Delta \log (R-1)$ to $\Delta M$. Such characterization is straight forward state of the art procedure and will not be described in detail here.

It is thus seen that apparatus has been provided which produces a mechanical output indicative of corrected static pressure $P_s$ and that an air data computer incorporating this apparatus has been provided which supplies a number of useful outputs to be utilized by the aircraft. Also, since static error correction is accomplished at the pressure transducers, all outputs are compensated for the error in indicated static pressure. It is further seen that the inherent disadvantages in electrical and pneumatic systems have been overcome by means of this novel structure and that the apparatus provided is simple and easily manufactured and assembled. Furthermore it is noted that the various pressure transducers identified as the static pressure transducer $q_c$ have identically the same form and may be constructed in the same manner thereby reducing manufacturing costs. Likewise the static error correction mechanism provides an output which may be utilized by both of the pressure transducers rather than having a separate corrector for each transducer. This feature again simplifies the manufacturing process. Another advantage is seen in the transducer itself wherein the elements are so arranged around the pivot axis that symmetry is achieved. This is to say the Z-shaped member and the bellows are arranged on opposite sides of the pivot axis so as to minimize any vibration and acceleration effects that might be produced in the system when it is mounted in an aircraft.

Finally it should be noted that many modifications may be made to the structure herein described without departing from the spirit of the invention. For example, it is within the skill of one in the art to modify the various shapes and connections herein in many obvious ways.

I therefore do not intend to be limited by the specific elements described in connection with the preferred embodiment but intend only to be limited by the following claims.

What is claimed is:

1. Air data computing apparatus comprising in combination:

first pressure transducing means having a first input connected to a source of indicated static pressure $P_{si}$, a second input connected to a source of pressure correction signal $\Delta P$ and an output $P_s$;

first motive means connected to said first pressure transducing means and operable by the output thereof to produce a mechanical motion indicative of log $P_s$;

first rebalance means including means characterized to convert mechanical motion indicative of log $P_s$ to mechanical motion indicative of $P_s$;

means connecting said first rebalance means to said first motive means and to said first pressure transducing means to provide rebalance of said first pressure transducing means;

second pressure transducing means having a first input connected to the source of $P_{si}$, having a second input connected to a source of total pressure $P_T$, having a third input connected to the source of $\Delta P$ and an output;

second motive means connected to said second pressure transducing means and operable by the output thereof to produce a mechanical motion indicative of log $q_c$;

second rebalance means including means characterized to convert mechanical motion indicative of log $q_c$ to mechanical motion indicative of $q_c$;

means connecting said second rebalance means to said second motive means and to said second pressure transducing means to provide rebalance of said second pressure transducing means;

mechanical difference means connected to said first motive means and to said second motive means and operable to provide a mechanical output motion indicative of the difference between log $P_s$ and log $q_c$;

further characterized means connected to said mechanical difference means and operable to convert the mechanical output motion thereof to a signal indicative of Mach number M;

means connected to said further characterized means and to the source of $\Delta P$ signal to provide a signal indicative of the ratio $\Delta P/P_s$ to the source of $\Delta P$ signal;

and means connected to said first rebalance means and to the source of $\Delta P$ signal to provide a signal indicative of $P_s$, said source of $\Delta P$ signal operating to multiply the $\Delta P/P_s$, signal and the $P_s$ signal so as to produce a signal indicative of $\Delta P$.

2. An air data computer comprising, in combination:

a source of indicated static pressure $P_{si}$;

a source of total pressure $P_T$;

static error correction means providing an ouput signal $\Delta P$ indicative of the error between $P_{si}$ and corrected static pressure $P_s$;

first pressure transducing means having a first input connected to said source of $P_{si}$, having a second input connected to said static error correction means to receive the signal $\Delta P$, having a rebalance input and operable upon unbalance of the signals at the various inputs to produce an output signal;

second pressure transducing means having a first input connected to said source of $P_{si}$, having a second input connected to said source of $P_T$, having a rebalance input and operable upon unbalance of the signals at the various inputs to produce an output signal;

first rebalance means including characterized means operable to convert signals indicative of log $P_s$ to signals indicative of $P_s$ and including motive means connected to the characterized means;

means connecting the motive means of said first rebalance means to said first pressure transducing means to receive the output signal therefrom;

means connecting the characterized means of said first rebalance means to the rebalance input of said first pressure transducing means, the motive means of said first rebalance means operable in accordance with the output signal from said first pressure transducing and with the characterized means to produce a signal indicative of log $P_s$, the characterized means of said first rebalance means operable to present the signal indicative of $P_s$ to said first pressure transducing means to rebalance said first pressure transducing means;

second rebalance means including characterized means operable to convert signals indicative of log $q_c$ to signals indicative of $q_c$ and including motive means connected to the characterized means;

means connecting the motive means of said second rebalance means to said second pressure transducer to receive the output signal indicative of change of $q_c$;

means connecting the characterized means of said second rebalance means to the rebalance input of said second pressure transducing means, the motive means of said second rebalance means operable in accordance with an output signal from said first pressure transducing means to produce a signal indicative of log $q_c$, the characterized means of said second rebalance means operable to convert the signal indicative of log $q_c$ to a signal indicative of $q_c$ and to present the signal indicative of $q_c$ to said second pressure transducing means to rebalance said second presure transducing means;

computer means having a first input connected to said first rebalance means to receive a signal indicative of log $P_s$, having a second input connected to said second rebalance means to receive a signal indicative of log $q_c$ and operable to produce an output signal indicative of Mach number M;

conversion means connected to said computer means to receive the signal indicative of M and to produce an output signal indicative of the ratio $\Delta P/P_s$;

and means connecting said static error correction means to said first rebalance means and to said conversion means to receive signals indicative of $P_s$ and $\Delta P/P_s$, said static error correction means operating to multiply $P_s$ and $\Delta P/P_s$ to produce an output signal indicative of $\Delta P$.

3. In an air data computer:

a first member;

means mounting said first member for movement from a predetermined position in accordance with a plurality of forces;

means applying a first of the plurality of forces to said first member in accordance with indicated static pressure $P_{si}$;

means applying a second of the plurality of forces to said first member in accordance with static pressure error $\Delta P$, said first member moving from the predetermined position in accordance with corrected static pressure $P_s$;

first rebalance means connected to said first member and operable in accordance with movement of said first member from the predetermined position to apply a rebalance force to return said first member to the predetermined position;

a second member;

means mounting said second member for movement from a predetermined position in accordance with a plurality of forces;

means applying a first of the plurality of forces to said second member in accordance with $P_{si}$;

means applying a second of the plurality of forces to said member in accordance with total pressure $P_T$;

means applying a third of the plurality of forces to said second member in accordance with $\Delta P$, said second member moving from the predetermined position in accordance with pressure differential $(P_T - P_s)$;

second rebalance means connected to said second member and operable in accordance with movement of said second member from the predetermined position to apply a rebalance force to return said second member to the predetermined position;

computer means connected to said first and said second rebalance means to receive signals indicative of functions of $P_s$ and $(P_T - P_s)$ therefrom and operable to produce an output signal which is a function of Mach number M;

static error correction means connected to said computer means and to said first rebalance means to receive signals indicative of functions of $P_s$ and M therefrom and operable to produce an output which varies in accordance with $\Delta P$;

and means connecting said static error correction means to said first member and to said second member to provide forces which vary in accordance with $\Delta P$ thereto.

4. In a computer for a craft having a source of indicated static pressure $P_{si}$ and a source of total pressure $P_T$ thereon:

a first circuit having a first input connected to the source of $P_{si}$, a second input and providing a first output signal indicative of true static pressure $P_s$ and a second output signal indicative of log $P_s$;

a second circuit having a first input connected to the source of $P_{si}$, a second input connected to the source of $P_T$, a third input and providing an output signal indicative of log $(P_T - P_s)$;

summing means having a first input connected to said first circuit to receive the second output signal indicative of log $P_s$, having a second input connected to said second circuit to receive the output signal indicative of log $(P_T - P_s)$ and providing an output signal indicative of log $(P_T - P_s) - \log P_s$;

characterized means having an input connected to said summing means to receive the output signal indicative of log $(P_T - P_s) - \log P_s$ and providing an output indicative of $$\frac{P_{si} - P_s}{P_s}$$

computing means having a first input connected to said first circuit to receive the first output signal indicative of $P_s$, having a second input connected to said characterized means to receive the ouput signal indicative of $$\frac{P_{si} - P_s}{P_s}$$

and providing an output signal indicative of $P_{si} - P_s$;

and means connecting the second input of said first circuit and the third input of said second circuit to said computing means to receive the output signal indicatve of $P_{si} - P_s$.

5. An air data computer comprising in combination:
a first pressure transducer having an input signal indicative of indicated static pressure $P_{si}$, having an input signal indicative of static error correction $\Delta P$ and operable to combine the $P_{si}$ and $\Delta P$ input signals to produce an output signal which is a function of corrected static pressure $P_s$;

a second pressure transducer having an input signal indicative of $P_{si}$, having an input signal indicative of total pressure $P_T$, having an input signal indicative of $\Delta P$ and operable to combine the $P_{si}$, $P_T$ and $\Delta P$ input signals to produce an output signal which is $q_c$ and is a functon of the difference in pressure between corrected static pressure and total pressure;

computer means connected to said first pressure transducer and said second pressure transducer to receive signals which are functions of $P_s$ and $q_c$ and operable to produce a signal which is a function of Mach number M;

correction signal generating means connected to said first pressure transducer and said computer means to receive signals which are functions of $P_s$ and M and operable to produce a signal indicative of $\Delta P$;

and means connecting said first pressure transducer and said second pressure transducer to said correction signal generating means to provide the signal indicative of $\Delta P$ to said first pressure transducer and said second pressure transducer.

6. Apparatus of the class described comprising, in combination:
a first pressure transducer having a first input connected to a source of indicated static pressure $P_{si}$, having a second input connected to a source of static error correction signal $\Delta P$, and operable to produce an output signal which varies in accordance with changes of corrected static pressure $P_s$;

a second pressure transducer having a first input connected to the source of $P_{si}$, having a second input connected to a source of total pressure $P_T$, having a third input connected to the source of $\Delta P$ and operable to produce an output signal which varies in accordance with changes of differential pressure $(P_T-P_s)$;

computing means having a first input connected to said first pressure transducer to receive a signal therefrom which is a function of $P_s$, having a second input connected to said second pressure transducer to receive a signal therefrom which is a function of $(P_T-P_s)$ and operable to produce an output signal which is a function of Mach number M;

and means connecting said first pressure transducer and said computing means to the source of $\Delta P$ to provide inputs thereto which vary with $P_s$ and M.

7. An air data computer comprising in combination:
a source of indicated static pressure signal $P_{si}$;
a source of total pressure signal $P_T$;
a source of static error correction signal $\Delta P$;
a first pressure transducer having a first input connected to said source of $P_{si}$, having a second input connected to said source of $\Delta P$ and providing an output which is a function of corrected static pressure $P_s$;

a second pressure transducer having a first input connected to said source of $P_{si}$, having a second input connected to said source of $P_T$, having a third input connected to said source of $\Delta P$ and providing an output which is a function of the pressure difference $(P_T-P_s)$;

computer means connected to said first pressure transducer and to said second pressure transducer to receive the outputs therefrom and operable to produce an output which is a function of Mach number M;

and means connecting said source of $\Delta P$ to said computer means and to said first pressure transducer to receive signals indicative of functions of M and of $P_s$ therefrom and operable to produce the correction signal $\Delta P$.

References Cited by the Examiner
UNITED STATES PATENTS

| | | | |
|---|---|---|---|
| 2,621,855 | 12/1952 | Hauser | 235—61 |
| 2,714,309 | 8/1955 | Redemske | 73—178 |
| 2,905,000 | 9/1959 | Roth | 73—389 |
| 2,937,526 | 5/1960 | Roche | 73—389 |
| 3,006,193 | 10/1961 | Li | 73—406 |
| 3,062,054 | 11/1962 | Fitch | 73—140 |
| 3,090,229 | 5/1963 | Howard | 73—182 |
| 3,094,868 | 6/1963 | Anderson et al. | 73—178 |
| 3,132,244 | 5/1964 | Kemmer et al. | 73—182 X |

LOUIS R. PRINCE, *Primary Examiner.*

LEO SMILOW, RICHARD C. QUEISSER, *Examiners.*